United States Patent
Kubiak

Patent Number: 6,159,876
Date of Patent: Dec. 12, 2000

[54] ROOFING PLY PRODUCT

[75] Inventor: Mira Kubiak, Wayne, N.J.

[73] Assignee: Building Materials Corporation of America, Wayne, N.J.

[21] Appl. No.: 09/411,355

[22] Filed: Oct. 1, 1999

Related U.S. Application Data

[63] Continuation of application No. 08/903,225, Jul. 22, 1997, abandoned.

[51] Int. Cl.$^7$ .................................................. D02G 3/00
[52] U.S. Cl. ........................... 442/82; 442/65; 427/209; 427/299; 427/305; 427/443; 428/364; 428/297.7
[58] Field of Search ................... 427/209, 299, 427/315, 443; 428/364, 297.7; 442/65, 82

[56] References Cited

U.S. PATENT DOCUMENTS 5,494,728 2/1996 Vermilion et al. .

*Primary Examiner*—Richard Weisberger
*Attorney, Agent, or Firm*—Walter Katz; William J. Davis; Marilyn J. Maue

[57] ABSTRACT

A process for making a roofing ply roll or sheet product which comprises pretreating a fiber glass mat with water to provide greater than 2 and less than 10 wt. % water therein, and impregnating said moisturized mat with molten asphalt, the amount of asphalt retained in said mat being directly related to the amount of water present in the pretreated mat. An ASTM D 2178 Type VI roofing ply sheet comprising a fiber glass mat impregnated with asphalt and having a tensile strength of at least 60 lbf/in CMD and a flexibility of about 0.2 or less in inch/lb stiffness modulus MD.

4 Claims, 1 Drawing Sheet

WT. OF ROOFING PLY 4 ROLL PRODUCT vs WATER FLOW RATE

WATER FLOW, lpm

Wt. of Roofing Ply 4 Roll Product (lbs)

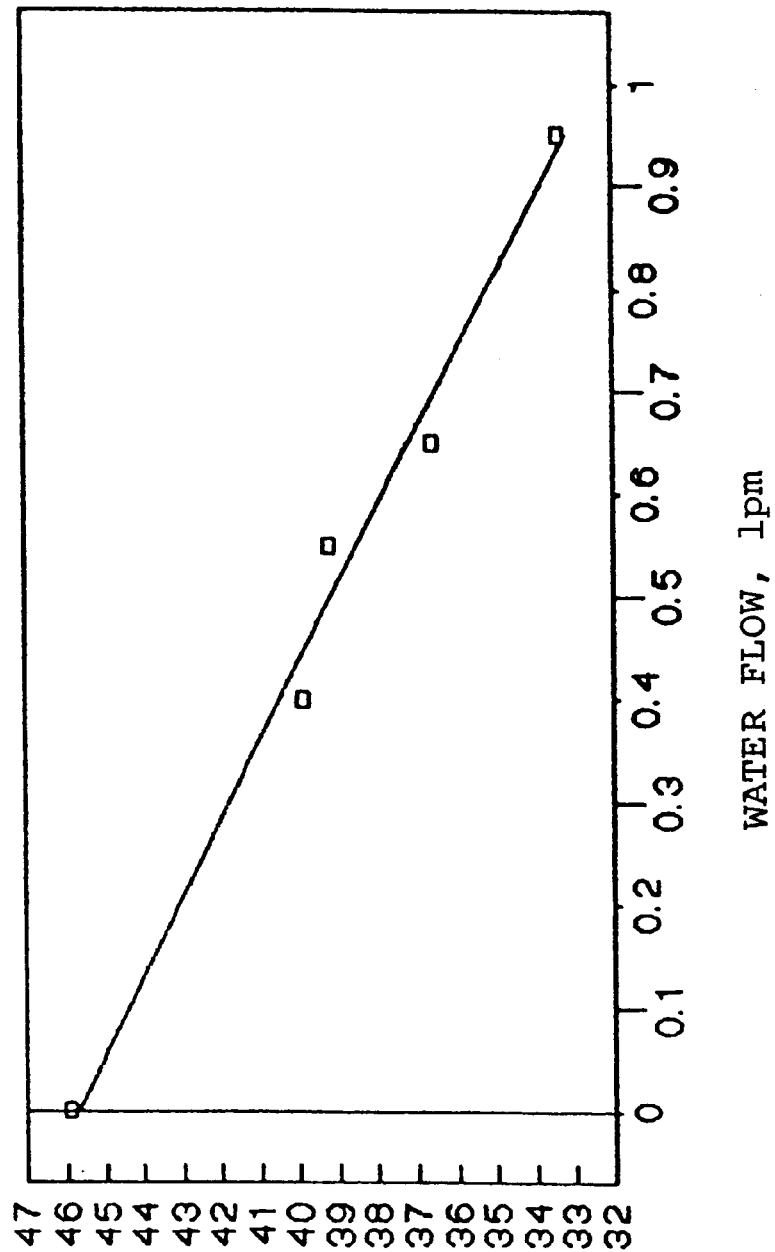

ROOFING PLY PRODUCT

This is a continuation, of application Ser. No. 08/903,225, filed on Jul. 22, 1997, abandoned.

BACKGROUND OF THE INVENTION

1. Field of the Invention

This invention relates to roofing ply roll or sheet products made by coating fiber glass mats with molten asphalt, and, more particularly to a process for making such products which are thin and low in weight, flexible, and of high tensile strengths.

2. Description of the Prior Art

Roofing ply sheet products are made by impregnating fiber glass mat rolls with an excess of molten asphalt, i.e. at an asphalt temperature of about 500° F. Typically, such molten asphalt is applied in a coating apparatus which includes suitable coating rolls and mechanical scrapers. The excess of asphalt which penetrates the glass mat, however, is being removed before the sheet is used commercially. Usually this is accomplished by squeezing the asphalt-soaked mat in the nip of the coating rolls and then scraping off asphalt remaining on the surface of the mat. Unfortunately, these squeezing and scraping steps result in considerable mechanical damage to the glass mat itself, which reduces its tensile strength to below a minimum value necessary and required for commercial use. Several methods have been used in the past to compensate for the observed loss of tensile strength of the sheet during the squeezing and scraping steps. Since the tensile strength of the roofing ply sheet is directly related to the amount of asphalt retained in the mat, an added amount of asphalt can be kept in the mat to provide increased tensile strength. Another technique is to use a thicker glass mat which would have a higher tensile strength but with reduced flexibility. Both methods, however, add to the weight of the product, which is undesirable, and increase its costs.

Accordingly, it is an object of the present invention to provide a process for making improved roofing ply roll and sheet products by a process in which a predetermined amount of asphalt can be impregnated into a glass fiber mat so that the conventional squeezing and scraping steps previously necessary to remove excess applied asphalt are no longer required.

Still another object of the invention is to provide a roofing ply sheet comprising fiber glass mat coated with asphalt which sheet is thin and light in weight, flexible, and has a high tensile strength.

A feature of the present invention in this art is the provision of a step of controlled moisturization of a glass mat prior to asphalt treatment, which provides an intermediate product whose receptivity to asphalt impregnation is predetermined by the amount of water retained therein.

SUMMARY OF THE INVENTION

This invention is based upon the discovery that asphalt pick-up by a glass fiber mat during preparation of roofing ply sheets is directly related to the moisture content in the glass mat. More particularly, an increase in the moisture content in the glass mat will slow down the asphalt penetration rate which will result in a decrease in the amount of retained asphalt in the mat. Accordingly, instead of saturating the mat with asphalt followed by squeezing and scraping to remove excess asphalt, as in the past, in this invention, only a predetermined amount of asphalt is applied to the glass mat to form the desired roofing ply sheets directly. The result is a product having a minimum amount of glass mat and/or asphalt, with enhanced flexibility and tensile strength.

IN THE DRAWING

The FIGURE is a graphical representation of the weight in lbs of a roofing Ply 4 sheet which includes a glass mat roll pretreated with water at various flow rates.

DESCRIPTION OF THE INVENTION

In this invention, moisturizing the glass mat is accomplished by application of atomized water through spray nozzles at a selected flow rate. The amount of water retained in the glass fiber mat, and, accordingly, the amount of asphalt impregnated therein, is predetermined by water flow rate. Suitably the moisturized glass mat roll contains greater than 2 and less than 10 wt % water, preferably about 4–6 wt %.

Typical line speeds are 300 to 900 lnft/min.

Typical line speeds (i.e. the speed at which the glass mat is moving through the conventional asphalt application line) are 300 to 900 lnft/min.

Ply 4 sheets* were made from a glass fiber mat roll [containing 100% M fibers of 13.5 μm nominal width,] having a roll weight of 35.4 lbs (e.g. [Gafmat] GAFMAT® 0920L, GAFMC, Wayne, N.J.), Ply 6** sheets were made from 100 g mats of [Gafmat] GAFMAT® 1000L (fiberglass mats of 120 g/m² basis weight). Both mats were pretreated with atomized water through spray nozzles before the mat proceeded through a conventional asphalt application line. The moisturized mat contained about 4–6 wt % water. As in the conventional process, molten asphalt at about 450–530° F. was impregnated into the thus-moisturized mat. Upon cooling, a thin, low weight, flexible roofing ply sheet of high tensile strength was obtained. Of particular note is the Ply 6 product which has a tensile strength of 60 lbf (pounds-force)/in minimum in the cross-machine direction (CMD), and a flexibility of only 0.2 inch/lbf stiffness modulus in the machine direction.

*are ply sheet type IV (which meets ASTM industry standard)
**are ply sheets type VI (which meets ASTM standard designated as 2178 type VI)

Ply 4 sheets were made from a glass fiber mat roll containing 100% M fibers of 13.5 μm nominal width, having a roll weight of 92 g (e.g. Gafmat® 0920L), Ply 6 sheets were made from 100 g mats of Gafmat® 1000 L. Both mats were pretreated with atomized water through spray nozzles before the mat proceeded through a conventional asphalt application line. The moisturized mat contained about 4–6 wt % water. As in the conventional process, molten asphalt at about 450–530° F. was impregnated into the thus-moisturized mat. Upon cooling, a thin, low weight, flexible roofing ply sheet of high tensile strength was obtained. of particular note is the Ply 6 product which has a tensile strength of 60 lbf/in minimum in the cross-machine direction, and a flexibility of only 0.2 inch/lbf stiffness modulus in the machine direction.

The results are shown in the Table below:

TABLE

| Roofing Ply Roll | Flexibility* | | Tensile Strength** | |
| --- | --- | --- | --- | --- |
| | w/ Moisture | w/o Moisture | w/ Moisture | w/o Moisture |
| Ply-4 | 0.170 | 0.170 | 57 | 50 |
| Ply-6 | 0.198 | 0.272 | 60 | 70 |

*MD stiffness modulus(in-lbf) (machine direction)
**CMDlbf/in (cross-machine direction)

While the invention has been described with particular reference to certain embodiments thereof, it will be understood that changes and modifications may be made which are within the skill of the art. Accordingly, it is intended to be bound only by the following claims, in which:

What is claimed is:

1. A process for making a roofing ply roll or sheet product which comprises uniformly pretreating a fiber glass mat with water to provide about 2 to about 6 wt. % water therein, and impregnating said pretreated mat with molten asphalt, the amount of asphalt retained in said mat being directly related to the amount of water present in the pretreated mat.

2. A process according to claim 1 wherein said pretreated mat contains about 4 to about 6 wt % water.

3. The product of the process of claim 1.

4. A roofing ply sheet which meets ASTM D 2178 Type VI standards comprising a fiber glass mat uniformly pretreated with about 2 to about 6 wt. % of water, and impregnated with asphalt, said sheet having a tensile strength of at least 60 pounds-force/inch in the cross-machine direction and a flexibility of about 0.2 or less inch-pound-force stiffness modulus in the machine direction.

* * * * *